United States Patent
Loder et al.

(10) Patent No.: US 7,890,338 B2
(45) Date of Patent: Feb. 15, 2011

(54) METHOD FOR MANAGING A WHITELIST

(75) Inventors: Theodore C. Loder, Ann Arbor, MI (US); Marshall Van Alstyne, Dexter, MI (US); Richard L. Wash, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 12/543,583

(22) Filed: Aug. 19, 2009

(65) Prior Publication Data

US 2009/0319290 A1 Dec. 24, 2009

Related U.S. Application Data

(62) Division of application No. 11/027,758, filed on Dec. 30, 2004, now abandoned.

(60) Provisional application No. 60/533,235, filed on Dec. 30, 2003.

(51) Int. Cl.
*G06Q 10/00* (2006.01)

(52) U.S. Cl. .......... 705/1.1; 705/14.47; 705/14.49; 705/14.51; 705/14.53; 705/345; 709/206; 709/225; 709/229; 709/203; 709/207; 379/93.02; 379/93.24; 379/100.09

(58) Field of Classification Search .......... 709/206
See application file for complete search history.

(56) References Cited

U.S. PATENT DOCUMENTS

| | | | |
|---|---|---|---|
| 6,393,464 B1 * | 5/2002 | Dieterman | 709/206 |
| 6,421,709 B1 * | 7/2002 | McCormick et al. | 709/206 |
| 6,691,156 B1 * | 2/2004 | Drummond et al. | 709/206 |
| 6,697,462 B2 | 2/2004 | Raymond | |
| 6,865,559 B2 * | 3/2005 | Dutta | 705/75 |
| 6,868,436 B1 * | 3/2005 | Fleming, III | 709/206 |
| 7,072,943 B2 * | 7/2006 | Landesmann | 709/206 |
| 7,222,158 B2 * | 5/2007 | Wexelblat | 709/206 |
| 7,293,065 B2 * | 11/2007 | Banister et al. | 709/206 |
| 7,366,761 B2 * | 4/2008 | Murray et al. | 709/206 |
| 7,415,425 B1 * | 8/2008 | Walker et al. | 705/14.34 |
| 7,467,212 B2 * | 12/2008 | Adams et al. | 709/229 |
| 7,472,074 B1 * | 12/2008 | Walker et al. | 705/26 |
| 7,523,045 B1 * | 4/2009 | Walker et al. | 705/8 |
| 7,653,698 B2 * | 1/2010 | Wieneke et al. | 709/206 |
| 7,660,857 B2 * | 2/2010 | Smith et al. | 709/206 |
| 7,680,886 B1 * | 3/2010 | Cooley | 709/206 |
| 2003/0023736 A1 * | 1/2003 | Abkemeier | 709/229 |
| 2004/0165707 A1 | 8/2004 | Raymond | |
| 2004/0215793 A1 * | 10/2004 | Ryan et al. | 709/229 |

(Continued)

OTHER PUBLICATIONS

"Spam, Spam, Spam, Spam, Spam, the FTC, and Spam"; Eric Allman. ACM Queue. New York: Sep. 2003. vol. 1, Iss. 6; pp. 1-8 attached.*

(Continued)

*Primary Examiner*—Matthew L Brooks

(57) ABSTRACT

An improved method is provided for managing a whitelist. Upon receipt of an electronic message from an approved sender, the message is reviewed for references to other potential sender that may be added to the whitelist. For example, the potential sender may be copied on the electronic message. Based on this reference, the potential sender is deemed trustworthy and placed on the recipient's whitelist.

14 Claims, 3 Drawing Sheets

U.S. PATENT DOCUMENTS

| | | | |
|---|---|---|---|
| 2004/0230531 A1 | 11/2004 | Weiss | |
| 2005/0033810 A1* | 2/2005 | Malcolm | 709/206 |
| 2005/0080855 A1* | 4/2005 | Murray | 709/206 |
| 2005/0086365 A1* | 4/2005 | Urro | 709/237 |
| 2005/0114516 A1* | 5/2005 | Smith et al. | 709/227 |
| 2005/0144279 A1* | 6/2005 | Wexelblat | 709/225 |
| 2005/0192899 A1* | 9/2005 | Reardon | 705/40 |
| 2006/0026107 A1 | 2/2006 | Urro | |
| 2006/0168006 A1* | 7/2006 | Shannon et al. | 709/206 |
| 2006/0224509 A1* | 10/2006 | Walker et al. | 705/40 |

OTHER PUBLICATIONS

"An economic answer to unsolicited communication"; Electronic Commerce archive Proceedings of the 5th ACM conference on Electronic commerce table of contents New York, NY, USA Session: Session 2 table of contents pp. 40-50 Year of Publication: 2004 ISBN:1-58113-711-0.*

QE A = Keenan, Tom. (Nov. 1999). Auctioning answers the latest Net craze [Web auction site where users post questions & pay for the best one]. ComputerWorld Canada, 15(23), 15. Retrieved May 6, 2009, from ProQuest Central database. (Document ID: 413360071).

QE B = Kelly McCollum. (Oct. 1999). Finding the answers to technical questions. The Chronicle of Higher Education, 46(8), A49. Retrieved May 6, 2009, from Research Library database. (Document ID: 45532118).

QE C = QuestionExchange.com Previews 'Name-Your-Price' Support for Open Source Business/Technology Editors. Business Wire. New York: Nov. 2, 1999. p. 1.

Technical forum, "Selling interrupt rights: A way to control unwanted e-mail and telephone calls", Scott E. Fahlman, IBM Systems Journal, vol. 41, No. 4, 2002, pp. 759-766.

\* cited by examiner

METHOD FOR MANAGING A WHITELIST

CROSS-REFERENCE TO RELATED APPLICATIONS

This application is a divisional of U.S. patent application Ser. No. 11/027,758 filed on Dec. 30, 2004. This application claims the benefit of U.S. Provisional Application No. 60/533,235 filed on Dec. 30, 2003. The entire disclosures of each of the above applications are incorporated herein by reference.

STATEMENT OF GOVERNMENTAL SUPPORT

This invention was made with government support under grant no. 0114368 awarded by the National Science Foundation (NSF). The government has certain rights in this invention.

FIELD OF INVENTION

The present invention relates generally to electronic junk mail (also referred to as spam) and, more particularly, to an economic mechanism for regulating electronic junk mail.

BACKGROUND OF THE INVENTION

Due to its low cost, speed, and freedom from geographical constraints, email has become a ubiquitous and arguably essential means of communication. Unfortunately, the same properties that make it so useful, combined with its openness and trusting design, enable unscrupulous marketers to broadcast email to untargeted audiences. The result is unnecessary and unwarranted costs for recipients.

Recent estimates indicate more than 50% of email is now spam, the volume of spam is growing rapidly, and worldwide costs exceed $20 billion annually. This enormous quantity of unwanted communications has reduced the signal to noise ratio of email to such an extent that it has become an issue of national importance.

Legislative and technological solutions continue to be the primary means pursued to stop or limit spam. No fewer than eight bills are pending before Congress, and more than half the states have enacted laws to regulate email. At the same time, the technology industry is rushing to provide products and services that give individuals and organizations back some control over their mailboxes. In 2002, at least $54.4 million was invested in anti-spam startups, up 65% from the previous year.

Pure technological and regulatory approaches limit unwanted communications by blocking or banning them. This goes against a principle of textbook economics: in terms of individual and aggregate social welfare, a system that facilitates valuable exchange will generally dominate a system that grants universal veto power to either power. An improvement in exchange follows from mechanism design and the principles of information asymmetry. The primary assumption is that the sender composing an email message has a better understanding of its relative value than does the recipient prior to reading it. This private information favors the sender. Therefore, a screening mechanism has been proposed that allows recipients to discriminate between classes of high and low quality senders or conversely a signaling mechanism that allows high quality senders to rise above the noise.

Analogous to a standard bond mechanism, delivering email to an inbox requires an unknown sender to place a small pledge into escrow with a third party. In the case of screening, recipients determine the value of this fee, which they can dynamically adjust to their opportunity costs. After the fee is placed into escrow, the email is delivered. When the recipient opens the email, they may act solely at their discretion to seize the pledge. Taking no action releases the escrow. This mechanism is most appropriate for situations where recipients have no pre-established relationships with the sender. If a recipient expects further communication with a particular sender, they can add the sender to a whitelist which will allow sender messages to pass through the screen unencumbered.

The present invention extends this electronic message system in two respects. First, an innovative method is proposed for managing the whitelist used by electronic message system. Second, an additional method is also proposed for soliciting electronic messages by a solicitor.

SUMMARY OF THE INVENTION

In accordance with the present invention, an innovative method is provided for managing a list of approved senders in an electronic message system. The method is comprised of: maintaining a list of approved senders associated with a recipient; receiving an electronic message intended for the recipient, where the electronic message references a sender residing on the list of approved senders and a potential sender whom is not on the list of approved senders; and placing the potential sender on the list of approved senders associated with the recipient.

In another aspect of the present invention, a method is provided for soliciting electronic messages by a solicitor. The method is comprised of: posting a request for electronic messages with an escrow agent, where the message request specifies a topic of interest to the recipient and includes a bond for payment to at least one sender of an electronic message sent in response to the message request; sending at least one electronic message from a sender to the recipient in response to the message request; and releasing the bond from the escrow agent to the sender subsequent to the receipt of the electronic message by the recipient.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

By way of background, an exemplary economic bond mechanism is described for regulating electronic junk mail. While the following description is provided with reference to email messages, it is readily understood that the concepts of the present invention are applicable to other types of electronic communications, including but not limited to telephone calls, voice messaging, instant messaging and short message services.

First, a few pertinent definitions are set forth. A sender is a person, machine, or entity that may take action to cause a message to be transmitted to a recipient. A recipient is the target party (person, machine, or entity) specified in the envelope, and the intended endpoint of a message transmission. A sender server is one or more agents (typically machines), acting in behalf of a sender (under administrative control of the sender), that the sender makes use of to send messages. Similarly, a recipient server is one or more agents (typically machines), acting in behalf of a recipient (under administrative control of the recipient), that the recipient makes use of to receive messages.

A bond is a binding agreement (and the record thereof) to pay a specified party under specified conditions. An escrow service is a company, person, or entity that acts as custodian for a posted bond. The escrow service may release the bond or the funds specified in the bond to various parties under specified conditions. An escrow server is a collection of one or more agents (typically machines) under administrative control of the escrow service that facilitates posting of a bond and verification of bond status for sender and receiver (and potentially other parties).

Figure 1:
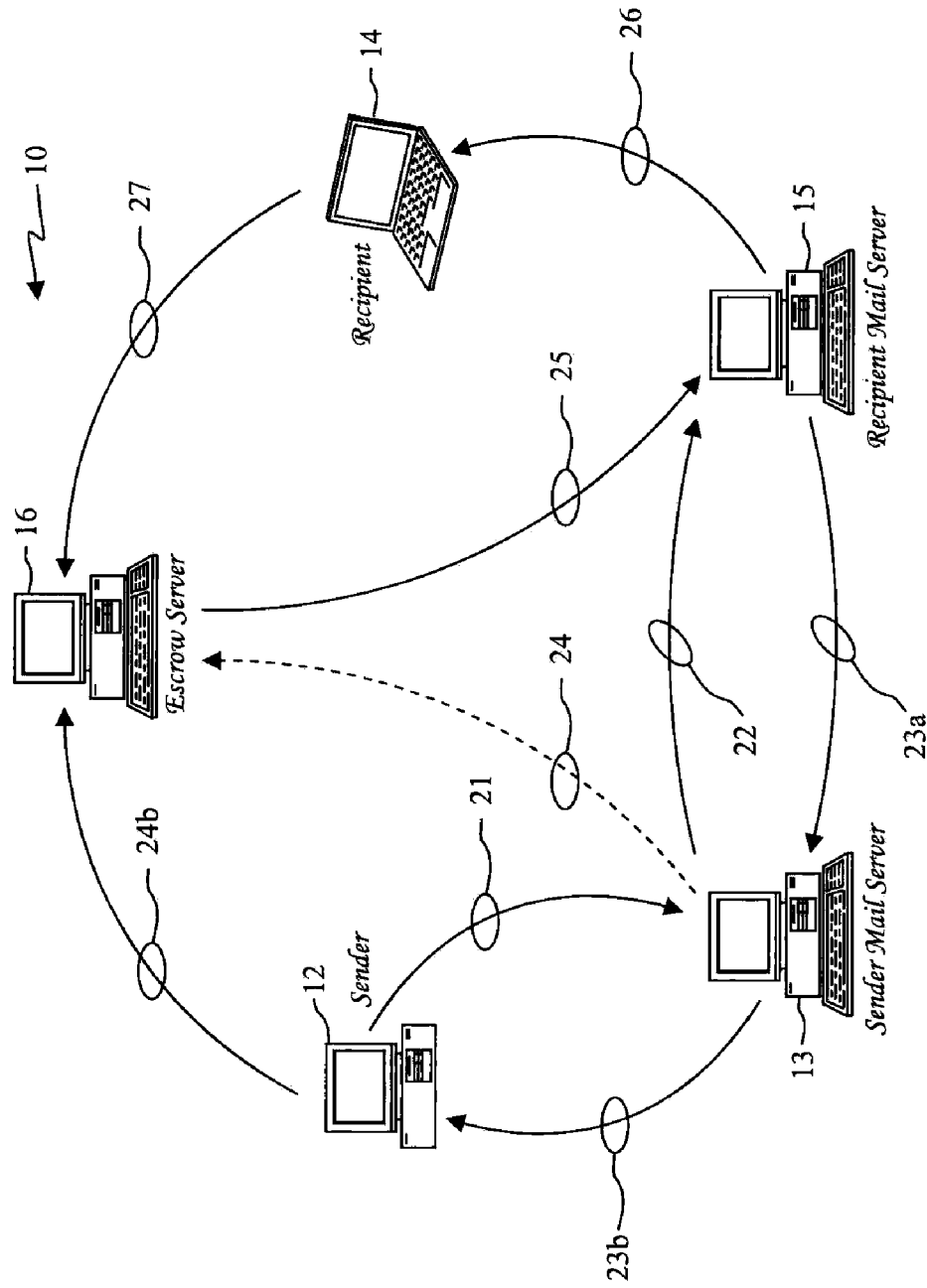
FIG. 1 is a diagram of an economic-based bond mechanism for regulating electronic messages.

Referring to FIG. 1, the economic mechanism 10 is defined by a set of parties, a sequence of messages that may be exchanged between the parties, and the actions that may occur as a result from their exchange. Aside from exchanging information, the mechanism enables funds to be transferred between parties under certain conditions. The following is a description of the sequence of messages and activities in one possible configuration of the economic bond mechanism.

The sender 12 initiates delivery of a message by providing the message and its envelope to the sender server 13 as diagrammatically shown at 21. If the sender 12 knows in advance that a message might be blocked and an escrow fee demanded, he can include an authorization of payment, up to some maximum amount, which can be acted upon by their sender server. Alternatively, a means could be implemented which allows the sender 12 to provide a rule to the sender server 13 to be used to evaluate a demand for bond message, if received, to allow it to act without intervention. Such a rule might, in effect, state the following: "Should a demand for bond message be received from a recipient server to which I (the sender) have sent a message within the last two days, post a bond of the requested size only if the requested size is less than $1.00; otherwise, do not post bond, but instead forward the demand for bond message to me".

Using the envelope accompanying the message, the sender server 13 contacts the recipient server 15 and attempts to deliver the envelope and message as shown at 14. The recipient server 15 checks a set of rules (specified in advance by the recipient 14) to determine if the message from the sender 12 is authorized. In the case that the message is authorized, several steps may be skipped. The message can be immediately delivered to the recipient 14 as shown at 26.

A whitelist serves as one exemplary authorizing step. A whitelist is a list of pre-authorized sender identities, as set by the recipient and/or their institution, from which email will pass through the server software and into the recipient mailbox. Strong identities may be needed to prevent spoofing. Use of cryptographic identities (e.g., public keys) represents a suitable technology which may be incorporated into the present invention. Although a certifying authority is not necessary for individual recipient and sender identities (for example, this approach is used with 'Secure Shell', in common use today for remote administration and access to server computers), it may be desirable for certain applications.

Aside from using a certificate of proof that a bond is posted as the criteria for allowing an email from a non-whitelisted sender to pass through to the recipient, it is envisioned that the sender can furnish other information to certify their identity. For example, the sender may enter additional information via a web page. The recipient server hosts this web page (or it is hosted by another party or server with which the recipient server has a relationship of trust). The challenge email sent back to the sender by the recipient server upon receipt of a non-whitelisted message contains the bond size, amount, and escrow account information, as necessary for the bond mechanism. However, to remove the requirement of bond posting, it can also include a URL describing the location of the challenge web page. Should a human sender choose not to post the bond, they have the option of visiting the recipient server-hosted web page and providing other evidence of authorization (determined in advance by the recipient), such as a password, or evidence of the sender having a previously established relationship with the recipient (such as indicating their birthday, real name, place of work, address, or a security code or password, given to them by the recipient).

In the case where the email is not authorized, the recipient server 15 keeps a copy of the message but does not deliver it to the recipient 14. Next, recipient server 15 attempts to deliver a message to the sender 12 containing a demand for a bond at 23a. The demand message includes information identifying and specifying how to contact the recipient's escrow service, the escrow account number of the recipient, the size of a required bond, and a means of identifying the original message that is held undelivered on the recipient server 15. To minimize the requirement for recipient intervention, the recipient sets the size of the bond demanded for unauthorized messages in advance (given as a preference or rule to the recipient server). Since the recipient 14 has control over the demanded amount, and this is the means of screening, adjusting the size of the bond amounts to adjusting the size of their screen. The recipient 14 can adjust according to their individual preferences.

The sender server 13 receives the bond demand message, and it may then take several actions, depending upon how it has been instructed (in advance) by the sender 12. First, it may forward a copy of the demand message back to the sender 12, as indicated at step 23b. The purpose of this is to alert the sender 12 that the original message to the recipient 14 requires a bond and is being held, undelivered. If the sender server 13 does not have the instructions or capability to automatically trigger posting of the bond, the sender 12 can do so manually by contacting the escrow server 16 at the location specified in the demand message indicated by step 24b.

It is at this step that the sender 12 may choose to signal. By authorizing the posting of a bond greater than the minimum bond size specified by the recipient 14, the sender 12 can signal their good intentions and message quality to the recipient 14, who will be able to assess the size of the bond upon delivery. If authorized and configured in advance, the sender server 13 may contact the escrow server 16 directly (indicated at 24a) and authorize the posting of the bond. The sender server 13 can then notify the sender 12 it has taken action.

When the escrow server 16 receives the authorization from the sender (or sender server), the escrow server 16 checks the sender's account to see that the sender 12 has enough funds to cover the bond. If so, the bond is posted, as specified, to an escrow account controlled by the recipient 14. If not, the sender 12 is notified that they must increase the funds in their account. Assuming the sender account has the funds to cover the requested bond and the bond is posted to the recipient account, the escrow server 16 sends a message to the recipient server at step 25. This message includes authentication of the escrow server 26, the identity of the original message (held by the recipient server), and an indication that the bond is posted.

It is envisioned that the third-party escrow service or services (e.g., one for the sender and one for the recipient) will have a record of bonds posted and claimed between parties, and therefore can, if authorized by the parties of the transaction, release this information to other parties. For example, if a recipient always keeps the bond posted by a sender to allow the delivery of email concerning products for sail boats, this could be a useful signal in the marketplace that the recipient is not interested in sailboat products. In this example, other sailboat marketers could use this knowledge to avoid posting bonds and/or sending email to this recipient, thereby reducing their marketing costs.

Once the recipient server 15 receives the notification from the escrow server 16, it releases the identified message it has been holding. At this point, the message is forwarded to the recipient, indicated in step 26. Given the different needs and preferences of people or entities making use of the proposed mechanism and a competitive marketplace, it is likely that several specialized escrow services will emerge. The network effects of the present invention are significant. Should the escrow services fail to interoperate, it will slow adoption and prevent the economies of scale for low cost transactions. Worse, like in the early days of the telephone, users would be required to maintain several relationships, one with each escrow service that their target recipients use. To address this issue, it is envisioned that an inter-escrow service payment network be deployed and a suitable set of protocols established.

In step 27, the recipient 14 receives the message. If the message is one that required the sender 12 to post a bond it, includes an indication of the bond size (attached to the message by the recipient server) along with an identifier for the bond held in escrow at the escrow service. The recipient 14 may choose whether or not they wish to seize the bond. If they wish to seize the bond, they notify the escrow service, which then places the bond funds held in escrow into their account. The recipient 14 may also decide to release the bond rather than keeping it. They may do this passively, by not actively indicating that they want the bond to be kept, or they may do it actively, by expressly notifying the escrow service. The latter approach causes the bond to return to the sender's account faster than the former.

In accordance with one aspect of the present invention, the economic bond mechanism contemplates the use of "letters of reference" that allow people to temporarily be placed on a recipient's whitelist. For example, if someone on your whitelist that you trust sends you an email and copies a third party, that third party can gain a temporary entry onto your whitelist which would allow them to communicate with you for at least a defined period of time. This would function as a letter of reference from a trusted third party. However, as noted above, this concept extends beyond email to other types of electronic communications.

Figure 2:
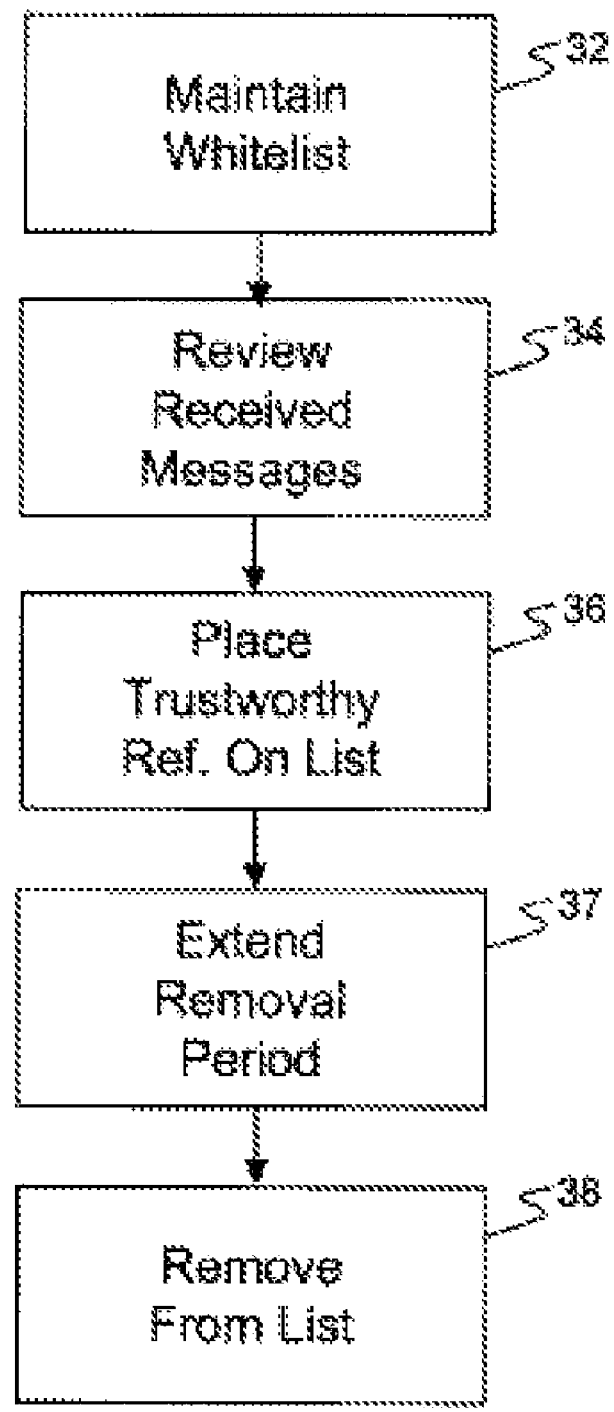
FIG. 2 is a flowchart illustrating a method for managing a list of approved senders in accordance with one aspect of the present invention.

FIG. 2 illustrates an exemplary method for managing a list of approved sender's (also referred to as a whitelist) in accordance with this principle. This method presumes a list of approved senders is being maintained by a recipient directly or by an agent of the recipient's choice (to which the recipient has delegated this function) as shown at 32.

Upon receiving an electronic message from an approved sender, the recipient server may review the message at step 34 for references to other potential senders whom are not currently on the list of approved senders. For example, a potential sender may be copied on the electronic message. In another example, the potential sender may be identified in the body of the message. In this example, an automated mechanism may parse the text of the message in order to identify references to potential senders. In the context of a voice message, known speech-to-text algorithms may be used to convert the voice message to text. Alternatively, the electronic message may be sent from the potential sender, but references an approved sender on the recipient's list. It is envisioned that other types of references to a potential sender may be embodied in the electronic message.

Based on this reference, the potential sender is deemed trustworthy and placed on the list of approved senders associated with the recipient at step 36. In one embodiment, the potential sender is placed on the list after a single reference. In another embodiment, the potential sender is placed on the list after a series of references which meet some specified criteria. For example, references to the potential sender are made in multiple messages from the same approved sender or one or more references to the potential sender are made in messages from different approved senders. It is readily understood that other criteria are within the scope of the present invention.

After a defined period of time, the potential sender may be removed from the list of approved senders as shown at step 38. To do so, an expiration date may be associated with each of the entries on the list of approved senders. In an exemplary embodiment, the window would have a base length (e.g., one month) where once a person gets added to the list, the expiration date is set to the length of that window in the future. Each time the added recipient interacts with the sender, the window is extended, i.e., set to a new expiration date one length of that window ahead of the last interaction. In this way, continued interaction is allowed, and a person can stay on the list as long as the interaction continues. What constitutes interaction, may have different interpretations (configurable by the recipient). For example, it might mean simply 'an email is received from the sender' or something more sophisticated like 'the recipient sent an email in response to an email received from the sender'. This latter definition prevents a sender from paying once then repeatedly sending new emails to keep the window from expiring.

In addition, the length of this window can also be a function of the interactions. If you have a very dense (timewise) set of interactions (you correspond a lot in a short period of time), then the length of the window can be elogated such that the person can go longer in time without contacting you before their whitelist entry expires. Someone you correspond with very frequently, such as family, will end up with very long windows, and people who you correspond with infrequently will have fairly short windows. Stated generally, the interaction history (content, messages, and timing), and other information available to the recipient or recipient server can serve as the input to a policy which decides window length.

In another aspect of the present invention, the economic bond mechanism described above may be used to solicit electronic messages by an intended recipient. The underlying principle is the use of a monetary bond posted to a third party in advance of a request for information. Since the reputation of the parties is unknown, the presence of a reputable third party facilitates exchange by reducing perceived risk. This creates the possibility for larger markets or for the existence of markets that would not otherwise exist. Again, this technique extends to other types of electronic communications.

Information flow is essential to knowledge management and effective decision making. To this end, a system is described that facilitates the exchange of valuable information, not just blocking of unwanted information such as spam. The class of information good for which this design is targeted contains information products that are commonly customized or created specifically for a particular solicitor based upon requirements that the solicitor states in advance. Such goods may be referred to as "ad-hoc" information goods. The solicitor's requirements could be as simple as the statement of a question for which they want an answer or may be more elaborate and could be represented, for example, in a detailed description with appropriate background and include references to outside information, meta-information, or supporting data. The production of the ad-hoc good may be from scratch, solely due to the solicitation of a potential solicitor, or it may be produced by editing, merging, or modification of one or more documents which pre-exist the solicitation. Either way, the cost of customization is expected to be high enough that a producer of the information product would not be willing to undertake production and transmit the finished good without advance payment or some assurance that they will later receive appropriate compensation.

Prior to describing an exemplary embodiment, a few pertinent definitions are set forth. A solicitor is a person or organization seeking ad-hoc information. A respondent is a person or organization who responds to a solicitation by producing or customizing information being requested. An escrow service is a third party who will hold funds in behalf of the primary parties in an exchange (i.e., solicitor and respondent) and releases the funds to one or the other party under certain circumstances. A solicitor's financial agent (SFA) is an agent in the employ of or under administrative control of the solicitor whose primary purpose is to be caretaker of a solicitor's funds. The SFA must be able to both send and receive funds in the currency of the marketplace to and from the other participants. Similarly, the respondent's financial agent is the caretaker of a respondent's funds.

A marketplace operator is an intermediary that provides several services to the other parties. For instances, the marketplace operator facilitates discovery of parties (sellers find buyers, buyers find sellers), maintains transaction records, assigns and manages identities and authentication of participating parties, and provides tools to primary parties to facilitate negotiation of the terms of exchange. Lastly, an underwriter is a financial institution that underwrites the electronically represented currency, essentially by guaranteeing its exchange value.

The principal risk to a solicitor is that he or she will be required to pay for a low quality good. Quality of good is addressed by requiring the solicitor to pay only when certain conditions are met. For example, the market operator could require payment from solicitor when at least r different respondents submit a response (e.g. a candidate good). The minimum r can be set by the market operator or by the solicitor at the time a solicitation is posted to the marketplace. The result of such a policy is the solicitor can be assured that he will be required to pay only if there is sufficient competition. To create the incentive for creation of a quality good in response to the solicitation, the solicitor, if required to pay, will have the choice as to which respondent actually receives the payment. Respondents know that if sufficient competition exists, at least one of them will be paid. Which one is paid depends on how the solicitor judges the usefulness of each of the candidate responses.

Although a solicitor is required to pay at or above r, they may still optionally pay for a good response when r is not reached. Whether or not solicitors have chosen to reward respondents under the condition of less than required competition can be a displayed component of a solicitor's reputation, made available to potential respondents when they review the solicitation. A respondent might choose to take the risk of undertaking the creation of a candidate response even when he suspects that the solicitation will not generate the specified number r of required responses if the solicitor has a reputation for paying regardless.

In contrast, the risk to a respondent is uncompensated effort to create the good, or the risk of non-payment. Risks to respondents are reduced in several additional ways. If the solicitor is required to post a bond before a request in made, the solicitation can be seen by respondents and the market operator enforces release of the bond from escrow according to known conditions, respondents have more information about the exchange outcome and are assured that compensation will be paid. It is also envisioned that the market operator may employ a reputation system for evaluating solicitors. Since solicitor reputation for paying (and under what criteria) is collected and displayed by the market operator, it is easily observable by a respondent before undertaking product creation, thereby further reducing the risk of respondents.

Optionally, the solicitor may not be required to post a bond in advance. Should he agree to post a bond, the rules of release of the bond still apply. Not posting a bond may increase perceived risk to respondents, but there may exist circumstances where a respondent is willing to accept this.

Product quality is addressed is at least two ways. First, since the solicitor may not be required to pay unless sufficient competition exists and respondents compete against each other for any payment, they have the incentive to create a product of high quality, or at least of higher quality than that of any of the other respondents. Second, the reduction of risk due to the bond and market operator regulation of the market should increase the number of potential respondents willing to participate.

Figure 3:
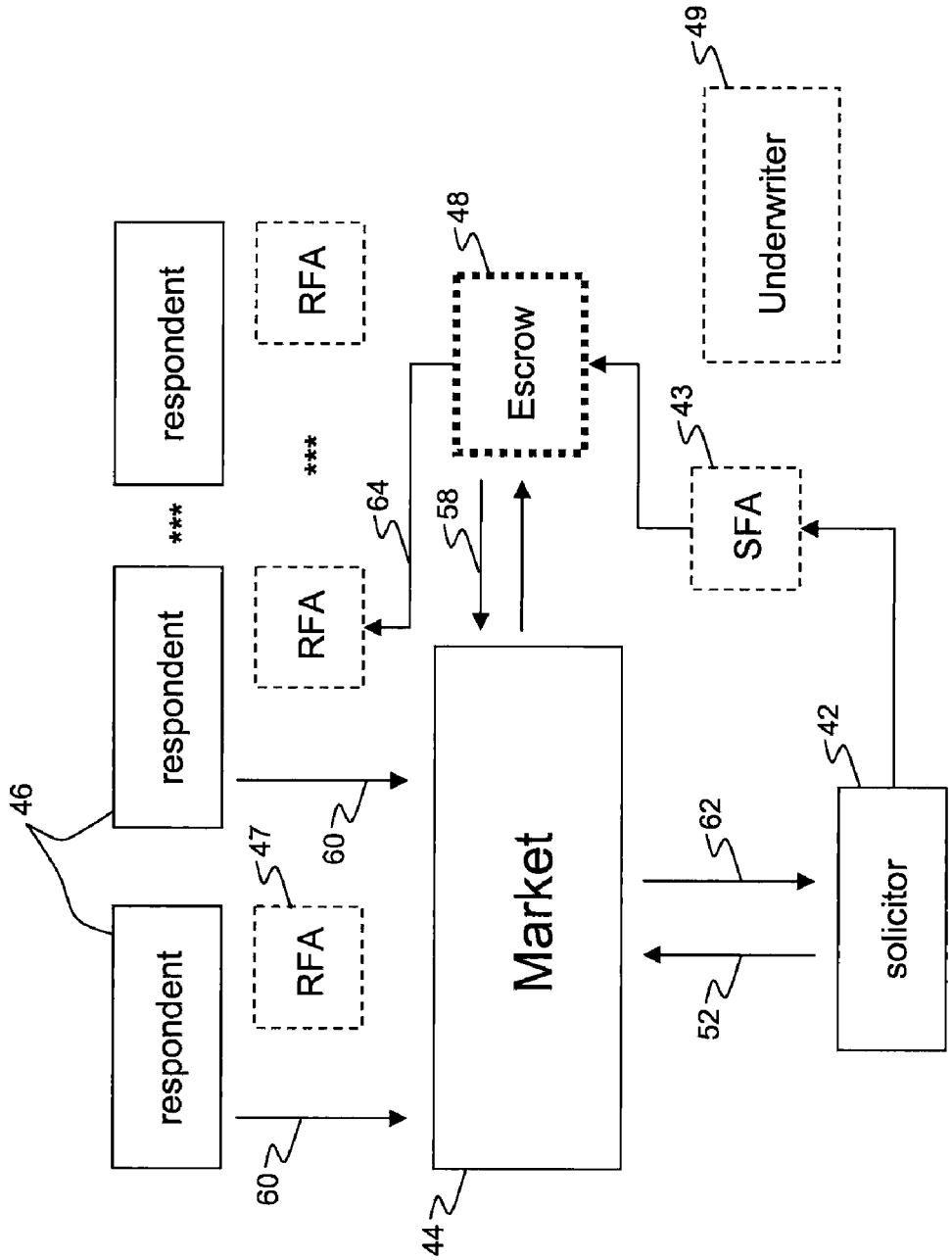
FIG. 3 is a diagram illustrating how the bond mechanism may be used to solicit electronic messages in accordance with another aspect of the present invention.

Referring to FIG. 3, a further description is provided as to how the marketplace may work, and the typical order in which communication and exchange between parties occurs. It is readily understood that other implementations and/or communication exchanges between the parties may occur within the broader aspects of the present invention.

First, a solicitor 42 posts a request at step 52 for an ad-hoc information product to the marketplace. This message request or product request specifies a topic of interest to the solicitor and the terms of payment. Although the request may include other types of information, the market operator may restrict the variety of terms to simplify participant decision-making and reduce their costs. The market operator 44 publishes the request where respondents 46 with the appropriate expertise can easily find it (the process of selecting an appropriate location may be aided by information provided by the solicitor).

To the solicitor 42, the market operator 44 furnishes a receipt of the posting with a reference identifier for the exchange, specification of the escrow agent 48, and the identity of a transaction-specific bond holding account. Using this information, the solicitor 42 sends notification to their financial agent 43 as indicated at 54 authorizing the posting of a bond to the bond holding account at the escrow service. The SFA 43 in turn transfers the appropriate funds to the escrow agent 48 at step 56, passing along the reference identifier.

At step 58, the escrow agent 48 sends notification to the market operator 44 that the bond has been posted (is held in escrow) and is of a valid currency. The market operator 44 indicates, in close proximity to the original solicitation (so that potential respondents can see), the status of the bond as 'posted'. It is also envisioned that the market operator may provide the escrow function such that the bond is posted directly with the marker operator.

In response to the request, one or more respondents may submit candidate products at step 60 to the market operator. Submission are made in electronic form and then published in an area where they can be read by the solicitor. Submissions may be made available for review by other respondents and/or potential respondents. It is further envisioned that respondents may revise their submissions upon reviewing the submissions made by others and this history of revisions is also made available for review by the various parties.

Moreover, the responsiveness of the submissions may verified by the market operator. In particular, the content of a submission is assessed in relation to the topic specified by the solicitor. Software-implemented algorithms for determining and correlating the content of electronic documents are readily known in the art and may be used to implement this feature of the present invention.

The solicitor 42 reviews the responses at step 62. If required to pay or if the solicitor voluntarily decides to pay, the solicitor 42 indicates to the market operator 44 which of the respondents 46 should receive payment (e.g. the value of the posted bond or a voluntary payment of the solicitor's choice). It is envisioned that the solicitor may select more than one of the respondents, including allocating the bond amongst all of the respondents. Alternatively, it is envisioned that the recipient of the bond may be selected either randomly or in accordance with a defined criteria (e.g., order of receipt) by the market operator. In the case where the solicitor posted a bond in escrow, the market operator sends notification to the escrow service, indicating which of the respondents should receive the payment. The escrow agent releases the bond held in escrow and transfers its value to the appropriate respondent financial agent(s).

In an alternative embodiment, respondents may be required to post a bond with the market operator (or an escrow agent) before their submissions will be considered by the solicitor. Thus, the bond posted by the respondents is in addition to the bond posted by the solicitor. In operation, the market operator would likely release the solicitor's bond to designated respondents before claiming any bonds posted by the respondents. Although bonds may be claimed from all of the respondents, the market operator preferably collect bonds only from respondents whose submissions were deemed non-responsive to the solicitor's request. For example, respondents who did not receive at least a portion of the solicitor's bond are deemed to have been non-responsive, although other criteria for assessing non-responsiveness are also envisioned.

Respondents may also post bonds of varying amounts, thereby signaling their interest to the solicitor. To the extent that the solicitor elects to consider submissions only from a subset of the respondents, the bond amount may be used to select the subset. For example, only submissions associated with the highest n bids may be considered by the solicitor. In this example, bonds are not claimed from respondents whose submissions were considered, but is collected from the remaining respondents. To the extent that bonds are collected from all of the respondents, the solicitor may collects an amount from respondent whose submissions were considered which is equal to the amount posted by the first losing bid. In any of these examples, the solicitor preferably does not collect an amount from the respondents which exceed the amount posted by the solicitor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for managing a list of approved senders in an electronic message system, comprising:
    maintaining a list of approved senders associated with a recipient on a computing device;
    receiving an electronic message intended for the recipient at the computing device wherein the electronic message references a sender residing on the list of approved senders and at least one potential sender whom is not on the list of approved senders;
    placing the potential sender on the list of approved senders associated with the recipient for a predefined period of time;
    extending duration of the predefined period of time upon further interaction between the recipient and the potential sender; and
    removing the potential sender from the list of approved senders after lapse of the predefined period of time, where the steps of placing, extending and removing are executed by the computing device.

2. The method of claim 1 wherein the electronic message was sent by the sender on the list of approved senders.

3. The method of claim 1 wherein the potential sender is copied on the electronic message received by the recipient.

4. The method of claim 1 wherein the potential sender is identified in a body of the electronic message.

5. The method of claim 1 wherein the electronic message was sent by the potential sender and the sender on the list of approved senders is either copied of the electronic message or identified in the body of the electronic message.

6. The method of claim 1 wherein the further interaction is further defined as at least one of an electronic message received by the recipient from the potential sender and an electronic message sent by the recipient to the potential sender.

7. A method for managing a list of approved senders in an electronic message system, comprising:
    maintaining a list of approved senders associated with a recipient on a computing device;
    receiving an electronic message intended for the recipient at the computing device wherein the electronic message references a sender residing on the list of approved senders and at least one potential sender whom is not on the list of approved senders;
    placing the potential sender on the list of approved senders associated with the recipient;
    removing the potential sender from the list of approved senders after a period of time, where the period of time is determined as a function of an amount of interaction between the recipient and the potential sender and the steps of placing and removing are executed by the computing device.

8. A method for regulating delivery of electronic messages to a recipient in a electronic messaging system, comprising:
    maintaining a list of approved senders associated with a recipient on a computing device;
    demanding a bond from a sender of an electronic message be placed into escrow for delivery of the electronic message, where the sender of the electronic message is not on the list of approved senders;
    receiving the electronic message intended for the recipient and sent by a sender residing on the list of approved senders at the computing device, where the electronic message references a potential sender whom is not on the list of approved senders;

placing the potential sender on the list of approved senders associated with the recipient;

delivering a subsequent electronic message sent by the potential sender to the recipient; and removing the potential sender from the list of approved senders after a period of time, where the period of time is determined as a function of an amount of interaction between the recipient and the potential sender and the steps of placing and removing are executed by a computing device.

9. The method of claim 8 further comprises delivering a different electronic message to the recipient when the sender of the different electronic message is on the list of approved senders.

10. The method of claim 8 further comprises delivering a different electronic message to the recipient when the sender pays the demanded fee to an escrow agent.

11. The method of claim 8 further comprises notifying an escrow agent of the receipt of an electronic message from a sender not on the list of approved senders, and delivering the electronic message to the recipient upon confirming payment of demanded bond to the escrow agent.

12. The method of claim 8 wherein the potential sender is either copied on the electronic message received by the recipient or identified in a body of the electronic message.

13. The method of claim 8 further comprises extending the period of time upon further interaction between the recipient and the potential sender.

14. The method of claim 13 wherein the further interaction is further defined as at least one of an electronic message received by the recipient from the potential sender and an electronic message sent by the recipient to the potential sender.

* * * * *

UNITED STATES PATENT AND TRADEMARK OFFICE
CERTIFICATE OF CORRECTION

| | | |
|---|---|---|
| PATENT NO. | : 7,890,338 B2 | Page 1 of 1 |
| APPLICATION NO. | : 12/543583 | |
| DATED | : February 15, 2011 | |
| INVENTOR(S) | : Theodore C. Loder et al. | |

It is certified that error appears in the above-identified patent and that said Letters Patent is hereby corrected as shown below:

Column 5, line 12, "sail boats" should be --sailboats--.

Column 5, line 35, "bond it," should be --bond, it--.

Column 5, line 60, "sender's" should be --senders--.

Column 6, line 46, "elogated" should be --elongated--.

Column 8, line 26, "is" should be --in--.

Column 9, line 5, "Submission" should be --Submissions--.

Column 9, line 12, after "may", insert --be--.

Column 9, line 59, "collects", should be --collect--.

Column 10, line 56, claim 8, "a electronic", should be --an electronic--.

Signed and Sealed this

Nineteenth Day of April, 2011

David J. Kappos
*Director of the United States Patent and Trademark Office*